US011773995B1

(12) United States Patent
Jassim et al.

(10) Patent No.: US 11,773,995 B1
(45) Date of Patent: Oct. 3, 2023

(54) RELIEF VALVE DEVICE

(71) Applicant: Prince Mohammad Bin Fahd University, Dhahran (SA)

(72) Inventors: Esam Jassim, Dhahran (SA); Abdullah Alhamdan, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

(21) Appl. No.: 18/173,429

(22) Filed: Feb. 23, 2023

(51) Int. Cl.
F16K 17/04 (2006.01)
(52) U.S. Cl.
CPC ................................ *F16K 17/0413* (2013.01)
(58) Field of Classification Search
CPC .......................... F16K 17/0413; F16K 17/0433
See application file for complete search history.

(56) References Cited

U.S. PATENT DOCUMENTS

| 8,413,955 B1* | 4/2013 | Rooney | F16K 1/465 |
| | | | 251/332 |
| 2011/0284092 A1* | 11/2011 | Spencer | F16K 25/00 |
| | | | 137/528 |
| 2012/0273220 A1 | 11/2012 | Ezekiel et al. | |
| 2016/0273668 A1* | 9/2016 | Trotzko | F16K 15/026 |
| 2017/0307094 A1* | 10/2017 | Choate | F16K 17/06 |

FOREIGN PATENT DOCUMENTS

| CN | 204459325 U | 7/2015 |
| CN | 211039728 U | 7/2020 |
| CN | 212563493 U | 2/2021 |
| CN | 216009673 U | 3/2022 |

OTHER PUBLICATIONS

"Crosby J-Series Direct Spring Pressure Relief Valves", Emerson, Emerson.com/FinalControl, VCTDS-00597-EN 19/07, 2017, 108 pages

* cited by examiner

*Primary Examiner* — P. Macade Nichols
(74) *Attorney, Agent, or Firm* — Oblon, McClelland, Maier & Neustadt, L.L.P.

(57) ABSTRACT

A relief valve device having a valve disc positioned above a nozzle, a disc holder surrounding an outer periphery of the valve disc, and a spring surrounding a valve stem. A bottom section of the nozzle is connected to a valve body and a top section of the nozzle is connected to the valve disc. An interior surface of the nozzle contains at least one groove having a circular cross-sectional profile. The relief valve device prevents flow through the nozzle when a pressure at an inlet of the nozzle is below a predetermined force of the spring. When the pressure exceeds the predetermined force of the spring the valve stem is moved linearly through the longitudinal axis of the spring to displace the valve disc from sitting atop the nozzle and permit flow through the nozzle.

15 Claims, 4 Drawing Sheets

RELIEF VALVE DEVICE

CROSS-REFERENCE TO RELATED APPLICATION

The present application is related to "Relief Valve Device" U.S. application Ser. No. 17/897,858 which is incorporated herein by reference in its entirety.

BACKGROUND

Technical Field

The present disclosure is directed to pressure relief valves; and more particularly to a pressure relief valve with improved stability during release of excessive pressure.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Pressure relief valves (also known as safety valves) are used in many systems to relieve excessive pressure, for instance in many industrial applications to prevent plant operating systems from reaching dangerously high pressures. Such valves include a nozzle and a valve seat which is normally closed by a valve disc slidably disposed in a body of the valve (valve body). The valve disc typically is biased in a closed position against the valve seat by a spring (like a compression spring). Generally, conventional a pressure relief valve is configured so that the lower surface of the nozzle receives the pressure of the gas or the steam tank from a lower inlet portion of the valve body so that the pressure is transmitted through the nozzle. The nozzle is in fluid communication with a pressurized medium in operative connection, and then is closed in the closed position of the pressure relief valve.

With the valve in the closed position, when the pressure in the valve exceeds a predefined set value, the valve disc "pops" open and places the nozzle in fluid communication with an exhaust port in the valve body, thus releasing the excessive pressure therefrom. Further, when the pressure in the valve decreases by a specified incremental amount, termed the blowdown differential or simply "blowdown" for the valve, the valve disc is again seated on the valve seat to dispose the valve back in its closed position.

One of the major issues with conventional pressure relief valves is the instability during releasing excessive pressure. In particular, the release of the excessive pressure may cause vibrations in the valve body of the pressure relief valve. These vibrations may result in mechanical waves that propagate through the valve body and the components arranged therein, and especially the valve disc which is directly exposed to excessive pressure. This, in turn, could displace the valve disc, thus affecting proper seating of the valve disc with respect to the nozzle, causing shuttering to the disc. Improper seating could result in a loss (leakage) of pressure from the valve body even in its closed position, which is undesirable. For example, in petrochemical industry with high pressure hydrocarbon gas systems, the leakage of the gases may be harmful in many cases and may need to be burned in a flare causing financial loss as well as excessive pollution.

It is an object of the present disclosure to provide a relief valve device that dampens the vibrations that occur during a sudden pop action of the valve disc and while releasing excessive pressure, to thereby prevent displacement of the valve disc with respect to the nozzle in the valve body.

SUMMARY

In an exemplary embodiment, a relief valve device is provided. The relief valve device includes a spring, a valve bonnet, a valve stem, a disc holder, a valve disc, a huddling chamber, a blowdown ring, and a nozzle. The valve disc is positioned above the nozzle. The spring is disposed in the valve bonnet and the spring surrounds the valve stem such that a longitudinal axis of the spring and a longitudinal axis of the valve stem are coaxial. The disc holder surrounds an outer periphery of the valve disc and is adjacent and in direct contact with a surface of the valve disc around an entire perimeter of the valve disc. The blowdown ring is disposed at a top section of the nozzle. A bottom section of the nozzle is connected to a bottom surface of a valve body and the top section of the nozzle is connected to the valve disc. An interior surface of the nozzle contains at least one groove, wherein the groove has a circular cross-sectional profile. The relief valve device is configured such that flow through the nozzle is prevented when a pressure at an inlet of the nozzle is below a predetermined force of the spring, and when the pressure exceeds the predetermined force of the spring, the valve stem is moved linearly through the longitudinal axis of the spring to displace the valve disc from sitting atop the nozzle and permit flow through the nozzle.

In some embodiments, the interior surface of the nozzle includes at least 4 grooves.

In some embodiments, the nozzle is substantially cylindrical along its length. The nozzle includes at least 2 grooves disposed towards an upper portion of the interior surface of the nozzle and at least 2 grooves disposed towards a lower portion of the interior surface of the nozzle.

In some embodiments, a first spacing between a first groove and a second groove in the upper portion of the interior surface of the nozzle is equal to a second spacing between a third groove and a fourth groove in the lower portion of the interior surface of the nozzle.

In some embodiments, the disc holder has a cylindrical stem section.

In some embodiments, the disc holder has a cylindrical base section.

In some embodiments, the cylindrical base section sits atop the valve disc.

In some embodiments, a diameter of the cylindrical stem section is from 0.6 to 0.8 times a length of the cylindrical base section.

In some embodiments, the disc holder is made of a metal.

In some embodiments, the disc holder, the blowdown ring, and an outer wall of the nozzle define the huddling chamber.

In some embodiments, the relief valve device includes a pressure adjusting screw disposed above a top surface of the valve bonnet.

In some embodiments, the pressure adjusting screw is configured to control the predetermined force of the spring.

In some embodiments, the valve stem is operably connected to the disc holder.

In some embodiments, the disc holder has a hollow cylindrical stem section and a hollow base section.

In some embodiments, the hollow cylindrical stem section and the hollow base section define a continuous space.

In some embodiments, the groove has a depth of from 0.1 to 0.3 times a thickness of the nozzle.

In some embodiments, the nozzle further includes one or more protrusions having a circular cross-section and a height of from 0.1 to 0.3 times a thickness of the nozzle. The protrusion is disposed on the interior surface of the nozzle.

In some embodiments, the first groove and the second groove interconnect to form a first spiral groove.

In some embodiments, the third groove and the fourth groove interconnect to form a second spiral groove.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
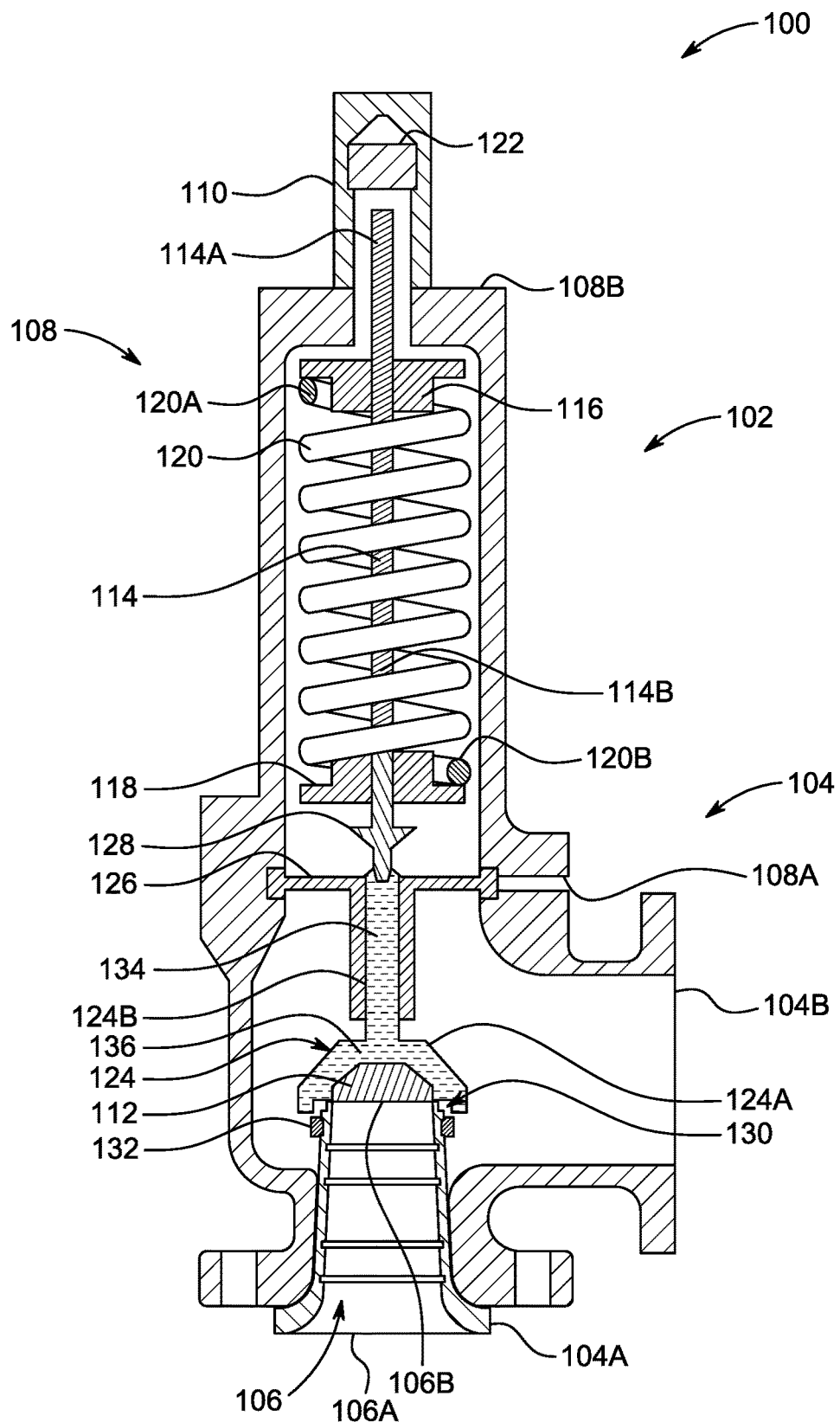
FIG. 1 is a schematic cross-sectional view of a relief valve device, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to a relief valve device with a design to reduce instability of a valve disc therein, due to vibrations during release of excessive pressure therefrom, which may otherwise affect placement setting (reseating) of the valve disc with respect to a nozzle in the relief valve device and which may, in turn, lead to pressure loss (leakage) during operation. In particular, the present disclosure provides a relief valve device having a nozzle that minimizes physical reaction on exposure to sudden excessive pressure relief forces and/or functions to diminish a flow of fluid therethrough to limit or avoid the vibration in the relief valve device. In one aspect a plurality of grooves is provided on an interior surface of the nozzle which function to slow a flow of from the high pressure side of the valve to the low pressure side fluid through the nozzle and thereby provides a dampening effect to reduce or eliminate vibration in the valve disc during the release of excessive pressure in the relief valve device.

Referring to FIG. 1, illustrated is a diagrammatic cross-sectional view of a relief valve device (represented by reference numeral 100); hereinafter, sometimes, simply referred to as "device 100" without any limitations. The relief valve device 100, as described herein, is a pressure relief valve which is a type of relief valve, or generally safety valve, used to control or limit the pressure in a pressurized fluid system (hereinafter, referred to as "system," not shown in drawings). Herein, the said system may be any of pneumatic and hydraulic systems which are used to control fluid variables, such as pressure, temperature, and flow. The relief valve device 100 is used to respond to an overpressure event and avoid overpressure on an upstream side (high pressure side) of the relief valve in the system and thereby avoid damage to any upstream process, instrument, or equipment failure. As used herein, the overpressure event may refer to any condition which may cause pressure in the system to increase beyond a specified design pressure. By use of the relief valve device 100, the pressure in the system is relieved by allowing the pressurized fluid to flow from an auxiliary passage out of the system. The relief valve device 100 is designed or set to open at a predetermined set pressure to protect pressure vessels and other equipment from being subjected to pressures that exceed their design limits. When the set pressure is exceeded, the relief valve device 100 opens to provide an auxiliary route for fluid escape or diversion thereby permitting at least a portion of the fluid to be diverted and provide pressure relief in the system. In some embodiments, the valve device 100 operates at a set pressure ranging from 20 pounds per square inch gauge (psig) to 2,500 psig, preferably 25 psig to 2,000 psig, preferably 30 psig to 1,500 psig, preferably 35 psig to 1,000 psig, preferably 35 psig to 500 psig, preferably 40 psig to 225 psig, preferably 50 psig to 200 psig, preferably 75 psig to 175 psig, preferably 100 psig to 150 psig, or 125 psig. In some embodiments, the valve device 100 operates between at least 1% and 30% above the set maximum operating pressure of the system, preferably 10% to 25%, preferably 15% to 20%, preferably 2% to 9%, preferably 3% to 8%, preferably 4% to 7%, or 5%.

As illustrated in FIG. 1, the relief valve device 100 includes a valve housing 102 to support various elements of the relief valve device 100. The valve housing 102 may serve as a principal element, providing a framework that holds the various elements of the relief valve device 100 together. In an embodiment, the valve housing 102 may be made of metallic material, such as stainless steel and aluminum, and polymeric material. The valve housing 102 includes a valve body 104, also referred to as a valve shell, configured to detachably attach with fluid pipes of the system using fasteners. For instance, the valve body 104 resists fluid pressure loads from connecting piping in the system and receives inlet and outlet piping of the system through threaded, bolted, or welded joints. For present purposes, the valve body 104 may be casted or forged from the selected material into required shape, which is usually cylindrical or spherical. In some embodiments, the length of the forged valve body 104 is between 1.1 and 1.7 times greater than the length of an exhaust port or auxiliary passage, preferably 1.2 to 1.6 times greater, preferably 1.3 to 1.5 times greater, or 1.4 times greater. The length of the valve body 102 can be defined as the length between a topmost surface of the valve body or the top surface of an adjusting screw 122, to a bottommost portion of a nozzle 106. The dimension of the exhaust port can be defined as the length or width of the opening in FIG. 1 that is exposed to an external atmosphere. The valve body 104 includes an inlet section 104A configured to fluidly couple with the fluid pipes via a nozzle 106 and an outlet section 104B configured to couple with an auxiliary pipe to allow excess fluid to exit therethrough. The inlet section 104A includes a neck portion configured to firmly engage with the nozzle 106. The relief valve device 100 further includes a valve bonnet 108 configured to detachably couple with the valve body 104 using fastening members. Various components responsible for releasing excessive pressure in the system are arranged in the valve bonnet 108. The valve bonnet 108 is a hollow body having a bottom end 108A configured to attach with the valve body 104 and a top end 108B coupled to a cap 110. As such, the valve body 104, the valve bonnet 108, and the cap 110 together are configured to define a hollow space to accommodate various operating elements of the relief valve device 100. It may be understood that the valve bonnet 108 is preferably a unitary part of the valve body 104; however, in other examples, the valve bonnet 108 may be a separately casted or forged from same or different material as that of the valve body 104 and is connected to the valve body 104 by a threaded, bolted, or welded joint. In some embodiments, the valve bonnet 108 is fabricated of brass, plastic, aluminum, steel, or the like. In some embodiments, the valve bonnet 108 is substantially cylindrical and has a diameter ranging from 2 inches to 8 inches, preferably 3 inches to 7 inches, preferably 4 inches to 6 inches, or 5 inches. In some embodiments, the length between the bottom end 108A and the top end 108B ranges from 2 inches (in) to 16 in, preferably 4 in to 14 in, preferably 6 in to 12 in, or 10 inches.

The nozzle 106 is disposed in the inlet section 104A of the valve body 104 such that the relief valve device 100 establishes fluid communication with the fluid pipes of the system to release excess pressure from the system. The nozzle 106 includes a bottom section 106A connected to a bottom surface, alternatively referred to as 'the inlet section 104A', of the valve body 104 and a top section 106B aligned with the outlet section 104B of the valve body 104. As shown in FIG. 1, the bottom section 106A of the nozzle 106 may act as an inlet for the relief valve device 100. The nozzle 106 is designed to connect the relief valve device 100 to the piping or equipment of the system. The nozzle 106 may use different types of end connections, such as butt or socket welded, threaded, or flanged for such connection purposes. In some embodiments, the nozzle 106 can accommodate pressurized gas in a range from 10 pounds per square inch/minute (psi/min) to 100 psi/min, preferably 20 psi/min to 90 psi/min, preferably 30 psi/min to 80 psi/min, preferably 40 psi/min to 70 psi/min, preferably 50 psi/min to 60 psi/min, or 55 psi/min. In some embodiments, the length between the top section 106B and the bottom section 106A ranges between 1 inch and 6 inches, preferably 2 inches to 5 inches, preferably 3 inches to 4 inches, or 3.5 inches. In alternate embodiments, the nozzle 106 takes on a conical shape, inverted shape, convergent shape, ring shape, flat-tipped shape, or divergent shape. In some embodiments, the top section of the nozzle 106B is also connected to a valve disc 112.

The relief valve device 100 further includes a valve disc 112 positioned above the nozzle 106. The valve disc 112 is a pressure-retaining part which provides the capability for permitting and prohibiting fluid flow in the relief valve device 100, e.g., fluid flow from an upstream high-pressure side to a low-pressure downstream side. The valve disc 112 is typically forged and, in some designs, hard surfaced to provide good wear characteristics. As shown in FIG. 1, in the relief valve device 100, the valve disc 112 lies and is positioned above the nozzle 106 at the top section 106B and seals the nozzle from the downstream portion of the valve. In one or more examples, the valve bonnet 108 may provide a seat or seal rings (not shown) to provide a seating surface for the valve disc 112. In a configuration, the valve bonnet 108 is machined to serve as the seating surface and seal rings are not used. In another configuration, forged seal rings are threaded or welded to the valve bonnet 108 to provide the seating surface. In some embodiments, the valve disc 112 is forged of aluminum, steel, plastic, polymers, bronze, iron, nickel, or copper. In some embodiments, the length of the valve disc 112 is between 0.5 times to 0.8 times the length of the valve bonnet 108, preferably 0.55 to 0.75 times, preferably 0.6 to 0.7 times, or 0.65 times. In some embodiments, the valve disc 112 includes a recess sized between 0.25 inches and 1 inch in depth to form a connection with the valve bonnet 108, preferably between 0.3 in to 0.9 in, preferably 0.4 in to 0.8 in, preferably 0.5 in to 0.7 in, or 0.6 in in depth. The relief valve device 100 further includes a valve stem 114 which is responsible for the proper positioning of the valve disc 112 in the valve bonnet 108. The valve stem 114 also provides the necessary movement to the valve disc 112 for opening or closing of the relief valve device 100. The valve stem 114 is typically forged separately and is connected to the valve disc 112 by threaded or welded joints. In some embodiments, the valve stem 114 is forged of metal, plastic, ceramic, or a combination of materials. In some embodiments, the valve stem 114 has a length that is between 0.4 and 0.8 times the length between the top end 108B and the bottom end 108A, preferably 0.45 to 0.75 times the length, preferably 0.5 to 0.7 times the length, preferably 0.55 to 0.65 times the length, or 0.6 times the length. In some embodiments, the valve stem 114 is substantially cylindrical and has a radius ranging from 0.2 inches to 0.6 inches, preferably 0.25 in to 0.55 in, preferably 0.3 in to 0.5 in, preferably 0.35 in to 0.45 in, or 0.4 inches in diameter. The valve stem 114 further includes a top end 114A received within the cap 110 and configured to slidably engage with a first support plate 116 and a bottom end 114B configured to engage with a second support plate 118. In an embodiment, each of the first support plate 116 and the second support plate 118 are substantially rectangular. In an embodiment, each of the first support plate 116 and the second support plate 118 are fabricated of metal, plastic, ceramic, or a combination of the like.

According to embodiments of the present disclosure, as also shown in FIG. 1, the relief valve device 100 is a spring-loaded pressure relief valve. In such embodiments, the relief valve device 100 includes a spring 120. In the illustrated example, the spring 120 is a helical spring; however, in other examples, the spring 120 may be use other type of compression springs, or even a diaphragm in some cases, without any limitations. In the relief valve device 100, the spring 120 is selected to fit inside the valve bonnet 108. As shown in FIG. 1, the spring 120 is disposed in the valve bonnet 108. Further, as shown, the spring 120 surrounds a periphery of the valve stem 114, such that the longitudinal axis of the spring 120 and longitudinal axis valve stem 114 are coaxial within the valve bonnet 108. In the relief valve device 100, the spring 120 is selected/designed for a set pressure of the relief valve device 100; i.e., to have a predetermined force of the spring. In some embodiments, the spring 120 is fabricated of a metal. In some embodiments, the spring 120 can stretch between 0.3 to 0.7 times the length of the valve bonnet 108, preferably 0.35 to 0.65 times the length, preferably 0.4 to 0.6 times the length, preferably 0.45 to 0.55 times the length, or 0.5 times the length. The spring force at least partially defines the set-pressure threshold, which is the minimum pressure at the nozzle 106 required to overcome the spring force and move the valve disc 112 out of sealing engagement with the nozzle 106. A first end 120A of the spring 120 is supported on the first support plate 116 and a second end 120B of the spring 120 is supported on the second support plate 118. In an embodiment, the first end 120A of the spring 120 is formed integral with the first support plate 116 and the second end 120B of the spring 120 is formed integral with the second support plate 118. In an embodiment, the first end 120A of the spring 120 is removable, or fastened/attached, from the first support plate 116 and the second end 120B of the spring 120 is removable, or fastened/attached, from the second support plate 118.

In some embodiments, the relief valve device 100 also includes a pressure adjusting screw 122. The pressure adjusting screw 122 is configured to control the predetermined force of the spring 120. This may be achieved by tightening or loosening the pressure adjusting screw 122, as may be understood by a person skilled in the art. As shown, the pressure adjusting screw 122 is configured above the top end 108B of the valve bonnet 108. Such arrangement provides access to the pressure adjusting screw 122 from outside of the valve bonnet 108, to allow for its adjustment as required. In some embodiments, the pressure adjusting screw 122 is forged of metal, metal alloys, plastics, or a combination of the like. In some embodiments, the pressure adjusting screw 122 is welded or molded to the valve bonnet 108 itself. In some embodiments, the pressure adjusting screw 122 is substantially cylindrical and has a diameter ranging from 0.1 to 0.4 times the diameter of the valve bonnet 108, preferably 0.15 to 0.35 times the diameter, preferably 0.2 to 0.3 times the diameter, or 0.25 times the diameter.

Such design of the relief valve device 100 helps the spring 120 to be implemented for opening and closing of the relief valve device 100. Herein, the relief valve device 100 is configured such that flow through the nozzle 106 is prevented when a first pressure at an inlet of the nozzle 106 is below the predetermined force of the spring 120; and when the first pressure exceeds the predetermined force of the spring 120, the valve stem 114 is moved linearly through an axis of the spring 120 to displace the valve disc 112 from its position atop the nozzle 106 and permit flow from the nozzle 106 through the valve body. In some embodiments, the valve stem 114 can move linearly from 0.6 to 0.8 times the length between the top end 108B and the bottom end 108A, preferably 0.625 to 0.775 times the length, preferably 0.65 to 0.75 times the length, preferably 0.675 to 0.725 times the length, or 0.7 times the length. In some examples, the relief valve device 100 further includes a bonnet plug (not shown) disposed within the valve bonnet 108 at a side surface of the valve bonnet 108. The bonnet plug helps to keep the pressure inside the valve bonnet 108 to be always almost equal to atmospheric pressure. Thus, the bonnet plug prevents flow through the nozzle 106 when the first pressure at the inlet of the nozzle 106 is below the predetermined force of the spring 120.

The relief valve device 100 further includes a disc holder 124 which may be a distinct component separable from the valve disc 112 or integrated with the valve disc. In some embodiment the valve disc 112 is a seating surface of the disc holder that seals the valve body 104 from the nozzle 106 and prevents fluid from entering the valve body 104 through the nozzle 106. The disc holder 124 is preferably designed to allow the valve disc 112 to float which provides play for an angular movement that reduces seat leakage from minor misalignments (ensuring that the valve disc 112 has 360 degrees of contact with the seat provided on the nozzle 106). As shown in FIG. 1, in the relief valve device 100, the disc holder 124 surrounds an outer periphery of the valve disc 112 and makes direct contact with a surface of the valve disc 112 around an entire perimeter of the valve disc 112. In the present examples, the disc holder 124 is made of a metal. In other examples, the disc holder 124 is made of plastic, ceramic, polymers, or metal alloys. Generally, the disc holder 124 may be made of same material as the valve disc 112. In an example, the disc holder 124, like the valve disc 112, may also be forged and, in some configurations, hard surfaced to provide good wear characteristics. In some examples the lateral length of the disc holder 124 is 1.1 to 1.4 times the length of the valve disc 112, preferably 1.15 to 1.35 times the length, preferably 1.2 to 1.3 times the length, or 1.25 times the length. In alternate embodiments, the disc holder 124 contains an adjustment ring to tightly seal the valve disc 112 to the disc holder 124 and is preferably made of a plastic or polymer.

In some embodiments, the relief valve device 100 may include a disc holder 124 having a hollow base section and a hollow cylindrical stem section extending vertically upward from the hollow base section. Further, the hollow cylindrical stem section and the hollow base section may define a continuous space. In an embodiment, the continuous space defined by both the hollow cylindrical stem section and the hollow base section may be filled with oil. For purposes of the present disclosure, the oil used to fill the disc holder 124 is a heavy oil, for example, but not limited to, mineral oil, polyalphaolefin, organophosphate ester and the like. Noncombustible inorganic oils are preferable for applications involving flammable fluids, e.g., silicon oils. In some embodiments, the oil has a density from 800 kg/m$^3$ to 1400 kg/m$^3$, preferably 900 kg/m$^3$ to 1300 kg/m$^3$, preferably 1000 kg/m$^3$ to 1200 kg/m$^3$, or 1100 kg/m$^3$. In some embodiments, the oil occupies between 60% and 100% of the volume within the cylindrical stem section, preferably 65% to 95%, preferably 70% to 90%, preferably 75% to 85%, or 80%. In some embodiments, the oil has a dynamic viscosity ranging from 10 MPa-s to 50 MPa-s, preferably 20 MPa-s to 40 MPa-s, or 30 MPa-s. In some embodiments, the oil has a specific gravity of from 0.82 to 0.94, preferably 0.84 to 0.92, preferably 0.86 to 0.9, or 0.88. In some embodiments, the cylindrical stem section is hollow along from 50% to 90% of an entire length of the cylindrical stem section, preferably between 60% and 80%, or 70%. The oil preferably has a viscosity of 40-150 cSt at 40 C, preferably 60-120 cSt or preferably 80-100 cSt. It may be appreciated by a person skilled in the art that the heavy oil is used as these are highly incompressible and may thus be better suited for providing the dampening effect in the relief valve device 100.

The relief valve device 100 further includes a huddling chamber 130. The huddling chamber 130 is around the periphery of the nozzle 106, that aids in providing a snap opening. If a huddling chamber is too large, it can cause a blow-down value of a relief valve to be higher than desired. Thus, it may be desirable to scale the huddling chamber so that the valve snaps open, e.g., opens with the aid of force imparted or enhanced by the huddling chamber, but maintains a low blow down value. The disc holder 124, a blowdown ring 132, and outer wall of nozzle 106 are configured to provide the huddling chamber 130. The huddling chamber is a space that is preferably defined by surfaces of the disc holder 124, the nozzle 106, and the blowdown ring 132. As shown in FIG. 1, the huddling chamber 130 is defined by bottom surfaces of the disc holder 124 having both vertical and horizontal components, a top surface of the blowdown ring 132 and a portion of a side surface of the nozzle 106. The huddling chamber 130 preferably extends around the entire circumference of an outer surface of the nozzle 106 in the form of a ring. Preferably, a portion of a side wall of the huddling chamber 130 is at least partially open although in other embodiments openings may be provided by gaps in the blowdown ring 132. The huddling chamber 130 is a space in which a fluid gathers; specifically, an annular space under a projecting collar of the valve disc 112, in which the fluid collects as soon as the relief valve device 100 opens. During operation of the relief valve device 100, the fluid in the huddling chamber 130 preferably exerts force on the valve disc 112, forcing the relief valve device 100 to open wider and to hold the relief valve device 100 open until the pressure on the upstream side of the valve drops. It may be appreciated that an outside diameter, shape, and thickness of the disc holder 124 plays a role in defining the shape of the huddling chamber 130, and thereby the initial lift and the performance of the relief valve device 100. In some embodiments, the huddling chamber 130 contains a volume of fluid ranging from 0.01 mL to 50 mL, preferably 0.05 mL to 25 mL, preferably 0.1 mL to 20 mL, preferably 0.5 mL to 175 mL, preferably 100 mL to 150 mL, or 125 mL of fluid. In some embodiments, the valve disc 112 is hollow and its volume is filled with an oil. In some embodiments, the hollow section of the valve disc 112 may be continuous with a hollow portion of the valve stem 114 so that there is a continuous volume between the two components. In some embodiments, the hollow section of the valve disc 112 may not be continuous with a hollow portion of the valve stem 114 so that there is a physical barrier between the two components, separating two distinct volumes.

The relief valve device 100 further preferably includes a blowdown ring 132. In the relief valve device 100, as shown in FIG. 1, the blowdown ring 132 is disposed at the top section 106B of the nozzle 106. The blowdown ring 132 is an adjustable ring with a design shape that modifies the effluent flow path. It may be appreciated that the shape of the huddling chamber 130 may also be defined based on the size of the blowdown ring 132. In the relief valve device 100, as shown in FIG. 1, the blowdown ring 132 is threaded onto the nozzle 106. In particular, the blowdown ring 122 is disposed at a top section 106B of the nozzle 106. The blowdown ring 132 may be adjusted vertically up or down to a position relative to contact with the valve disc 112. The position of the blowdown ring 132 may change the blowdown (or reseat) pressure; and the closer the blowdown ring 132 is to the nozzle 106, the lower the pressure in the system will need to be for the relief valve device 100 to close (more blowdown). The position of the blowdown ring 122 in the valve bonnet 108 is fixed with a locking screw (not shown). In the relief valve device 100, the blowdown ring 132 may also be swapped to different size or different shaped rings to adjust performance based on the expected relief fluid. In some embodiments, the blowdown ring 132 has a length from 0.1 to 0.4 times the length of the valve disc 112, preferably 0.15 to 0.35 times the length, preferably 0.2 to 0.3 times the length, or 0.25 times the length. In some embodiments, the blowdown ring 132 is shaped of plastic or metal. In some embodiments, the blowdown ring 132 is spaced away from top section 106B of the valve disc 112 from between 0.05 inches or 0.3 inches, preferably 0.1 inches to 0.25 inches, or 0.175 inches.

It may be appreciated that the relief valve device 100 is generally modular. The internal parts for the relief valve device 100, including the valve disc 112, the disc holder 124, the blowdown ring 132 may be interchanged for ones with a different design to customize performance of the relief valve device 100 based on the application, fluid service, and set pressure. In general, the shape of the huddling chamber 130 (created by the shape and size of the disc holder 124), the position and shape of the blowdown ring 132, and the characteristics of the fluid being relieved together determine the initial opening force and the initial lift of the relief valve device 100. The relief valve device 100 may have a "pop action" as it typically pops open at a preset pressure. The pop action occurs because the huddling chamber 130 is designed with an area that is approximately 10/6-30% larger than the valve seat (as the disc holder 124 is bigger than the valve disc 112), preferably 12%-28%, preferably 14%-26%, preferably 16%-24%, preferably 18%-22%, or 20%. Once the pressure under the seat is enough to lift the valve disc 112 off the nozzle 106, there is a step change in the upward force on the spring 120 and the relief valve device 100 pops open. Such sudden pop may cause vibration and consequently mechanical waves to propagate in the valve body 104, which, in turn, may affect seating of the valve disc 112 with respect to the nozzle 106.

In the present embodiments, the disc holder 124 has a stem portion, preferably continuous or in mechanical communication with the valve stem 114. As shown in FIG. 1, the stem portion can be described as extending upwards in the valve bonnet 108, from the valve disc 112. In particular, the stem portion has a stem section and a base section. In an embodiment, the stem section is a cylindrical stem section, with the two terms being interchangeably used hereinafter. That said, in other examples, the stem section may have any other suitable shape, such as cylindrical cross-section, without any limitations. In some embodiments, the stem section has a diameter that is between 1.1 and 1.3 times the diameter of the pressure adjusting screw 122, preferably 1.15 to 1.25 times greater, or 1.2 times greater. In some embodiments, the stem section is forged of metal, plastic, or ceramic. In some embodiments, the stem section has a length that is 0.3 to 0.6 times the length between 108A and 108B of the valve bonnet 108, preferably 0.35 to 0.55 times greater, preferably 0.4 to 0.5 times greater, or 0.45 times greater. Further, in an embodiment, the base section may be a cylindrical base section. That said, in other examples, the base section may have any other suitable shape, such as circular cross-section, without any limitations. In the relief valve device 100, as shown, the base section sits atop the valve disc 112. Further, the cylindrical stem section extends upwards from the cylindrical base section, forming the disc holder 124. In an example, a diameter of the cylindrical stem section is from 0.1 to 0.3 times a length of the cylindrical base section, preferably 0.125 to 0.275 times a length, preferably 0.15 to 0.25 times a length, preferably 0.175 to 0.225 times a length, or 0.2 times a length. For instance, in a particular example, as may be seen from FIG. 1, the diameter of the cylindrical stem section is 0.7 times the length of the cylindrical base section. In some embodiments, the cylindrical base section is made of metal, plastic, ceramic, or a combination of the like.

According to preferable embodiments of the present disclosure, the disc holder 124 may be at least partially hollow and filled with oil. In an embodiment, the disc holder 124 has a hollow cylindrical stem section, and the oil is present in the cylindrical stem section of the disc holder 124. In an embodiment, the disc holder 124 has a hollow cylindrical stem section 134 and a hollow base section 136. Further, the hollow cylindrical stem section 134 and the hollow base section 136 define a continuous space, and both the hollow cylindrical stem section 134 and the hollow cylindrical base section 136 are filled with the oil. In some embodiments, the total volume of the stem section with the valve disc 112 is between 1.2 and 2 times greater than the total volume of the hollow space in the base section, preferably 1.3 to 1.9 times greater, preferably 1.4 to 1.8 times greater, preferably 1.5 to 1.7 times greater, or 1.6 times greater.

In the relief valve device 100, when the valve disc 112 may be subjected to vibration due to push from release of excessive pressure of the fluid from the nozzle 106, the oil in the disc holder 124 may help to dampen such vibrations, thus minimizing propagation of mechanical vibrations in the relief valve device 100 and preventing risk of the valve disc 112 being displaced and not being properly seated onto the nozzle 106. Further, oil present in both the hollow cylindrical stem section 134 and the hollow cylindrical base section 136 may provide an enhanced dampening effect for vibrations in the valve disc 112. Further, in some embodiments, the valve stem 114 is fluidly connected to the disc holder 124. In such case, the oil from the disc holder 124 may also be passed to the valve stem 114. The valve stem 114 is in direct or indirect mechanical connection with the valve disc 112 and with the oil present therein, may provide a relatively enhanced dampening effect for vibrations in the valve disc 112.

Figure 2A:
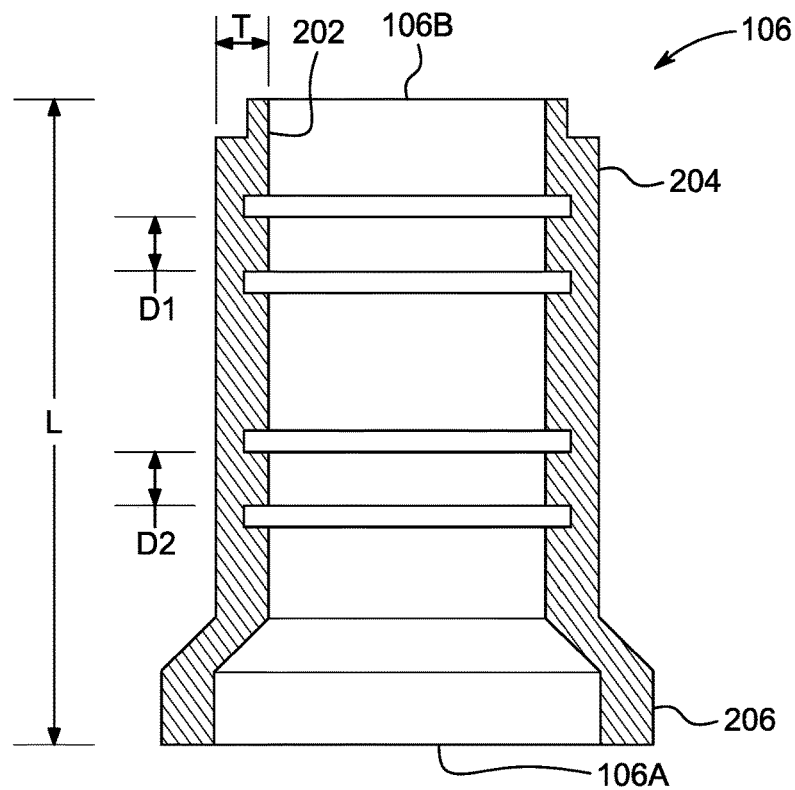
FIG. 2A is a schematic cross-sectional side view of a nozzle of the relief valve device of FIG. 1, according to one embodiment.

Referring to FIG. 2A, a schematic cross-sectional side view of the nozzle 106 is illustrated, according to an embodiment of the present disclosure. The nozzle 106 is substantially cylindrical along a length 'L' thereof and includes an inner wall 202 and an outer wall 204. The outer wall 204 defines an outer diameter equal to or greater than a diameter of an inlet at the inlet section 104A of the valve body 104 such that the nozzle 106 is attached to the inlet using a press fit or an interference fit mechanism. The length 'L' of the nozzle 106 is defined between the top section 106B and the bottom section 106A thereof. In one embodiment, the outer diameter of the nozzle 106 may be consistent throughout the length 'L' thereof. In some embodiments, the outer diameter of the nozzle 106 may vary throughout the length 'L' thereof to define a tapered shape. The bottom section 106A of the nozzle 106 includes a stepped diametric portion 206 configured to fit intact with the inlet of the valve body 104 and fluidly communicate with a passage of the fluid pipe of the system. In an embodiment, the stepped diametric portion 206 has a length from a first end to a second end of the nozzle 106 that is from 1.1 to 1.5 times a length of the outer wall 204 from a first end to a second end of the nozzle 106, preferably 1.2 to 1.4 times, or 1.3 times. In an embodiment, grooves 210 may be disposed in the stepped diametric portion 206 in addition to the space between the inner walls 202.

Figure 2B:
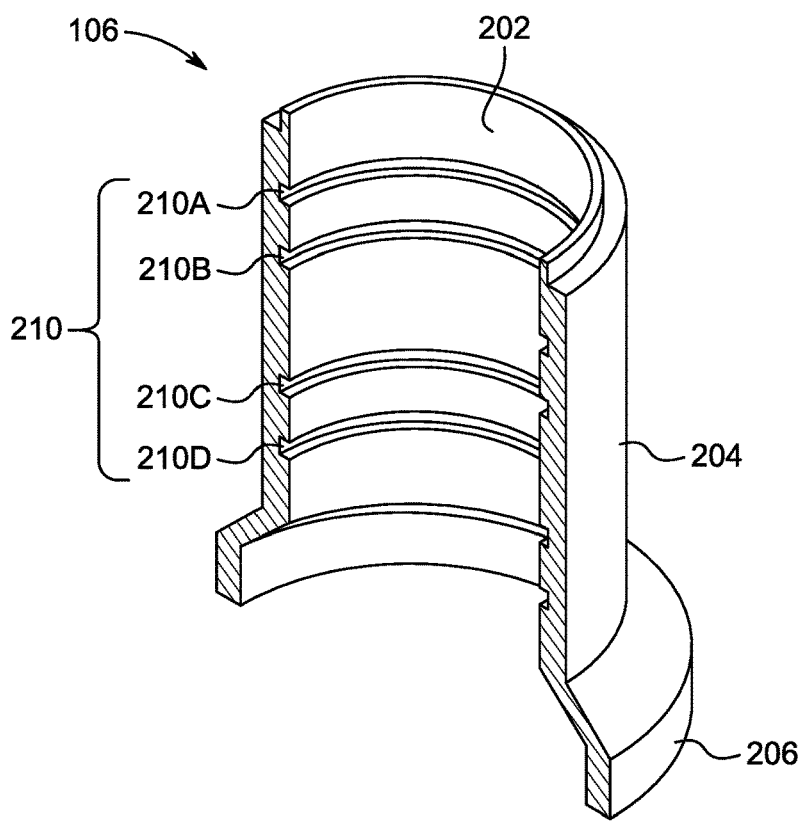
FIG. 2B is a schematic cross-sectional perspective view of the nozzle of FIG. 2A.

Referring to FIG. 2B, a schematic cross-sectional perspective view of the nozzle 106 shown in FIG. 2A is illustrated. As shown in FIG. 2A and FIG. 2B, the nozzle 106 includes a plurality of grooves 210 defined on the inner wall 202, otherwise referred to as 'the interior surface 202', thereof. In some embodiments, the nozzle 106 may include at least one groove 210. According to the present disclosure, the interior surface 202 of the nozzle 106 includes four grooves 210. In an embodiment, the interior surface 202 of the nozzle 106 contains from 4 to 20 grooves 210, preferably from 6 to 18 grooves, preferably from 8 to 16 grooves, preferably from 10 to 14 grooves, or 12 grooves. The plurality of grooves 210 includes a first groove 210A and a second groove 210B disposed towards an upper portion of the interior surface 202 of the nozzle 106 and a third groove 210C and a fourth groove 210D disposed towards a lower portion of the interior surface 202 of the nozzle 106. The first groove 210A, the second groove 210B, the third groove 210C, and the fourth groove 210D are collectively referred to as 'the grooves 210' and individually referred to as 'the groove 210' unless otherwise specifically mentioned. Preferably a first spacing 'D1' defined between the first groove 210A and the second groove 210B in the upper portion of the interior surface 202 of the nozzle 106 is equal to a second spacing 'D2' defined between the third groove 210C and the fourth groove 210D in the lower portion of the interior surface 202 of the nozzle 106. In some embodiments, the first groove 210A and the second groove 210B interconnect to form a first spiral groove and the third groove 210C and the fourth groove 210D interconnect to form a second spiral groove. In an embodiment, each of the first groove 210A, the second groove 210B, the third groove 210C, and the fourth groove 210B interconnect to form a combined, single spiral groove.

In an embodiment, the grooves 210 extend around an entire circumference of the inner wall 202 of the nozzle 106. In an embodiment, the grooves 210 extend around a portion of the inner wall 202 of the nozzle 106, namely from 40-90% of the entire circumference of the inner wall 202, preferably from 50-80%, preferably from 60-70%, or 65%. In an embodiment, an individual groove, such as the first groove 210A, has a height ranging from 0.3 to 0.7 times the spacing D1, preferably from 0.4 to 0.6, or 0.7 times the spacing D1. In an embodiment, an individual groove, such as the first groove 210A, has a height ranging from 0.3 to 0.7 times the spacing D2, preferably from 0.4 to 0.6, or 0.7 times the spacing D2. In an embodiment, each groove 210 is etched into the inner surface of the nozzle 106 by an acid etching or laser process. In an embodiment, each of the plurality of grooves 210 has a circular cross-sectional profile. In some embodiments, each of the plurality of grooves 210 may have a semi-elliptical shape, a semi-circular shape, or a polygon shape known in the art. In some embodiments, each of the plurality of grooves 210 has a depth of from 0.1 to 0.3 times a thickness 'T' of the nozzle 106, preferably from 0.15 to 0.25 times the thickness, or 0.2 times the thickness. The thickness 'T' of the nozzle 106 may be defined as the length between the inner wall 202 and the outer wall 204 thereof.

In the relief valve device 100, when the valve disc 112 may be subjected to vibration due to push from release of excessive pressure of the fluid from the nozzle 106, the plurality of grooves 210 helps to dampen such vibrations, thus minimizing propagation of mechanical vibrations in the relief valve device 100 and preventing risk of the valve disc 112 being displaced and not being properly seated onto the nozzle 106. Further, position of the first groove 210A, the second groove 210B, the third groove 210C, and the fourth groove 210D in the interior surface 202 of the nozzle 106 helps to reduce a speed at which the fluid flows through the nozzle 106 and thereby enhances the dampening effect to reduce or eliminate vibration in the valve disc 112. The dampening effect may vary based on the number of grooves 210 provided in the interior surface 202 of the nozzle, the cross-section of each groove 210, and a spacing defined between two adjacent grooves 210.

Figure 3:
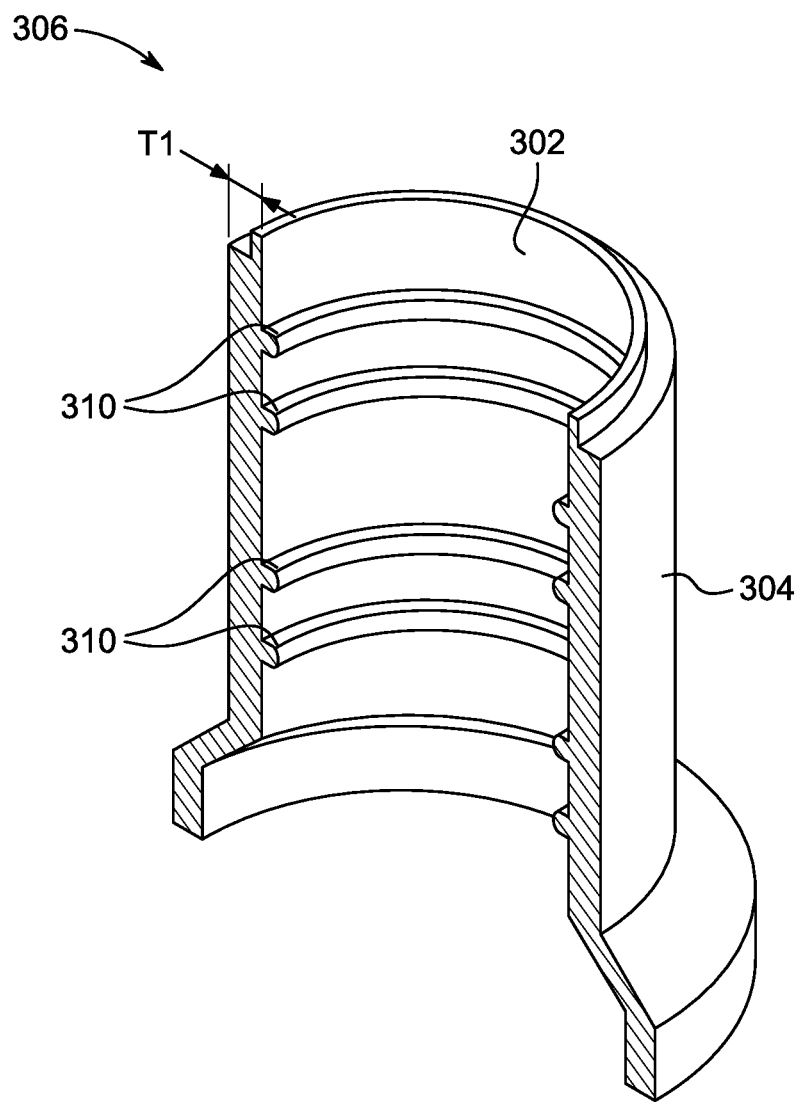
FIG. 3 is a schematic cross-sectional side view of a nozzle, according to another embodiment.

In some embodiments, the relief valve device 100 may include a nozzle 306, as shown in FIG. 3. The nozzle 306 may include one or more protrusions 310 disposed on an interior surface 302 thereof. Particularly, the protrusion 310 may be defined in the form of an annular ring on the interior surface 302 of the nozzle 306. Further, the protrusions 310 extend radially outward, whereas the grooves 210 in FIG. 2 extend radially inward. Each of the protrusions 310 may have a circular cross section having a height of from 0.1 to 0.3 times a thickness 'Ti' of the nozzle 306, preferably 0.2 times the thickness. The thickness 'Ti' of the nozzle 306 may be defined between the interior surface 302 and an exterior surface 304 thereof. In some embodiments, the nozzle 306 may include four protrusions 310. In an embodiment, the nozzle 306 includes from 4 to 20 protrusions 310, preferably from 6 to 18, preferably from 8 to 14, preferably from 10 to 12, or 11 protrusions 310. Two protrusions 310 may be disposed towards an upper portion of the interior surface 302 of the nozzle 306 and two protrusions 310 may be disposed towards a lower portion of the interior surface 302 of the nozzle 306. Further a spacing between the two protrusions 310 at the upper portion of the nozzle 306 may be equal to a spacing between the two protrusions 310 at the lower portion of the nozzle 306. In some embodiments, the protrusions 310 at the upper portion of the nozzle 306 interconnect to form a first spiral protrusion and the protrusions 310 at the lower portion of the nozzle 306 interconnect to form a second spiral protrusion. In an embodiment, each the four protrusions 310 interconnect to form a combined, single spiral protrusion. In an embodiment, the protrusions 310 extend around an entire circumference of the inner wall 302 of the nozzle 306. In an embodiment, the protrusions 310 extend around a portion of the inner wall 302 of the nozzle 306, namely from 40-90% of the entire circumference of the inner wall 302, preferably from 50-80%, preferably from 60-70%, or 65%. In an embodiment, each protrusion 310 is etched into the inner surface of the nozzle 306 by an acid etching or laser process. In an embodiment, each protrusion 310 has a circular cross-sectional profile. In some embodiments, each protrusion 310 may have a semi-elliptical shape, a semi-circular shape, or a polygon shape known in the art.

Figure 4:
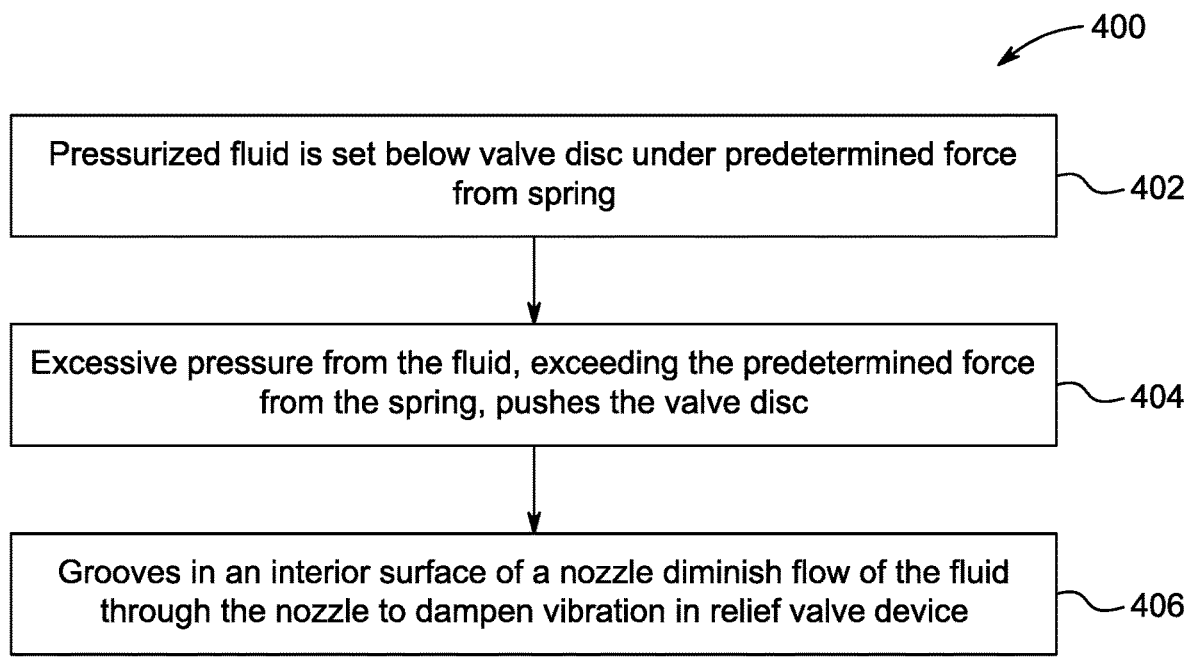
FIG. 4 is an exemplary flowchart illustrating operation of the relief valve device of FIG. 1, according to certain embodiments.

Referring to FIG. 4, an exemplary flowchart 400 listing steps involved in operation of the relief valve device 100 of FIG. 1 is illustrated, according to certain embodiments. Herein, the steps of the flowchart 400 of FIG. 4 have been explained with reference to described elements in the preceding paragraphs. Initially, a pressurized fluid is set below the valve disc 112 under the predetermined force from the spring 120, as described in step 402. The pressurized fluid may build up below the valve disc 112 to exceed the predetermined force of the spring 120. The excessive pressure from the fluid, exceeding the predetermined force of the spring 120, may flow through the nozzle 106 and push the valve disc 112 to cause the relief valve device 100 to open, as described in step 404. At step 406, the plurality of grooves 210 provided in the interior surface 202 of the nozzle 106 may act as dampers and may slowdown the fluid flowing through the nozzle 106. Thereby, the nozzle 106 dampens vibrations in the valve disc 112 as explained in the preceding paragraphs. Due to the controlled flow of the fluid through the nozzle 106, the pop action of the valve disc 112 may be avoided or limited and thereby vibration of the relief valve device 100 may be reduced or eliminated.

Thus, the design of the relief valve device 100 of the present disclosure may help to overcome the instability issues due to vibrations in conventional pressure relief valves during release of excessive pressure therefrom, and thereby prevent possible mechanical failures, such as improper seating of the valve disc 112 due to displacement with respect to the nozzle 106. The grooves 210 in the nozzle 106 or protrusions 310 in the nozzle 306 may minimize the reaction on sudden POP and prevents pressure waves from continuous movement as seen in a conventional nozzle design. Particularly, the grooves 210 in the nozzle 106 increase the damping coefficient which eventually reduces the impact pressure during the sudden opening of the relief valve device 100 needed to release the excessive pressure. Further, the grooves 210 in the nozzle 106 help in keeping the relief valve device 100 more stable and make the valve disc 112 rested easier. The relief valve device 100 of the present disclosure with the above-described features may particularly be useful in high pressure applications including, but not limited to, such as gas industry (like hydrocarbon gases), HVAC industry, aerospace industry.

Numerous modifications and variations of the present disclosure are possible in light of the above teachings. It is therefore to be understood that within the scope of the appended claims, the invention may be practiced otherwise than as specifically described herein.

The invention claimed is:

1. A relief valve device, comprising:
   a spring;
   a valve bonnet;
   a valve stem;
   a disc holder;
   a valve disc;
   a huddling chamber;
   a blowdown ring; and
   a nozzle;
   wherein the valve disc is positioned above the nozzle;
   the spring is disposed in the valve bonnet;
   the spring surrounds the valve stem such that a longitudinal axis of the spring and a longitudinal axis of the valve stem are coaxial;
   the disc holder surrounds an outer periphery of the valve disc and is adjacent and in direct contact with a surface of the valve disc around an entire perimeter of the valve disc;
   the blowdown ring is disposed at a top section of the nozzle;
   a bottom section of the nozzle is connected to a bottom surface of a valve body and the top section of the nozzle is connected to the valve disc;
   an interior surface of the nozzle contains at least one groove, wherein the groove has a circular cross-sectional profile; and
   wherein the relief valve device is configured such that flow through the nozzle is prevented when a pressure at an inlet of the nozzle is below a predetermined force of the spring, and when the pressure exceeds the predetermined force of the spring, the valve stem is moved linearly through the longitudinal axis of the spring to displace the valve disc from sitting atop the nozzle and permit flow through the nozzle;
   wherein the disc holder has a cylindrical stem section and a cylindrical base section, wherein the cylindrical base section sits atop the valve disc and wherein a diameter of the cylindrical stem section is from 0.6 to 0.8 times a length of the cylindrical base section.

2. The relief valve device of claim 1, wherein the interior surface of the nozzle comprises at least 4 grooves.

3. The relief valve device of claim 2, wherein the nozzle is substantially cylindrical along its length;
   the nozzle comprises at least 2 grooves disposed towards an upper portion of the interior surface of the nozzle and at least 2 grooves disposed towards a lower portion of the interior surface of the nozzle.

4. The relief valve device of claim 3, wherein a first spacing between a first groove and a second groove in the upper portion of the interior surface of the nozzle is equal to a second spacing between a third groove and a fourth groove in the lower portion of the interior surface of the nozzle.

5. The relief valve device of claim 4, wherein the first groove and the second groove interconnect to form a first spiral groove.

6. The relief valve device of claim 4, wherein the third groove and the fourth groove interconnect to form a second spiral groove.

7. The relief valve device of claim 1, wherein the disc holder is made of a metal.

8. The relief valve device of claim 1, wherein the disc holder, the blowdown ring, and an outer wall of the nozzle define the huddling chamber.

9. The relief valve device of claim 1, further comprising a pressure adjusting screw disposed above a top surface of the valve bonnet.

10. The relief valve device of claim 9, wherein the pressure adjusting screw is configured to control the predetermined force of the spring.

11. The relief valve device of claim 1, wherein the valve stem is operably connected to the disc holder.

12. The relief valve device of claim 1, wherein the nozzle further comprises one or more protrusions having a circular cross-section and a height of from 0.1 to 0.3 times a thickness of the nozzle, wherein the protrusion is disposed on the interior surface of the nozzle.

13. A relief valve device, comprising:
a spring;
a valve bonnet;
a valve stem;
a disc holder;
a valve disc;
a huddling chamber;
a blowdown ring; and
a nozzle;
wherein the valve disc is positioned above the nozzle;
the spring is disposed in the valve bonnet;
the spring surrounds the valve stem such that a longitudinal axis of the spring and a longitudinal axis of the valve stem are coaxial;
the disc holder surrounds an outer periphery of the valve disc and is adjacent and in direct contact with a surface of the valve disc around an entire perimeter of the valve disc;
the blowdown ring is disposed at a top section of the nozzle;
a bottom section of the nozzle is connected to a bottom surface of a valve body and the top section of the nozzle is connected to the valve disc;
an interior surface of the nozzle contains at least one groove, wherein the groove has a circular cross-sectional profile; and
wherein the relief valve device is configured such that flow through the nozzle is prevented when a pressure at an inlet of the nozzle is below a predetermined force of the spring, and when the pressure exceeds the predetermined force of the spring, the valve stem is moved linearly through the longitudinal axis of the spring to displace the valve disc from sitting atop the nozzle and permit flow through the nozzle;
wherein the disc holder has a hollow cylindrical stem section and a hollow base section.

14. The relief valve device of claim 13, wherein the hollow cylindrical stem section and the hollow base section define a continuous space.

15. A relief valve device, comprising:
a spring;
a valve bonnet;
a valve stem;
a disc holder;
a valve disc;
a huddling chamber;
a blowdown ring; and
a nozzle;
wherein the valve disc is positioned above the nozzle;
the spring is disposed in the valve bonnet;
the spring surrounds the valve stem such that a longitudinal axis of the spring and a longitudinal axis of the valve stem are coaxial;
the disc holder surrounds an outer periphery of the valve disc and is adjacent and in direct contact with a surface of the valve disc around an entire perimeter of the valve disc;
the blowdown ring is disposed at a top section of the nozzle;
a bottom section of the nozzle is connected to a bottom surface of a valve body and the top section of the nozzle is connected to the valve disc;
an interior surface of the nozzle contains at least one groove, wherein the groove has a circular cross-sectional profile; and
wherein the relief valve device is configured such that flow through the nozzle is prevented when a pressure at an inlet of the nozzle is below a predetermined force of the spring, and when the pressure exceeds the predetermined force of the spring, the valve stem is moved linearly through the longitudinal axis of the spring to displace the valve disc from sitting atop the nozzle and permit flow through the nozzle;
wherein the groove has a depth of from 0.1 to 0.3 times a thickness of the nozzle.

* * * * *